Figure 1:
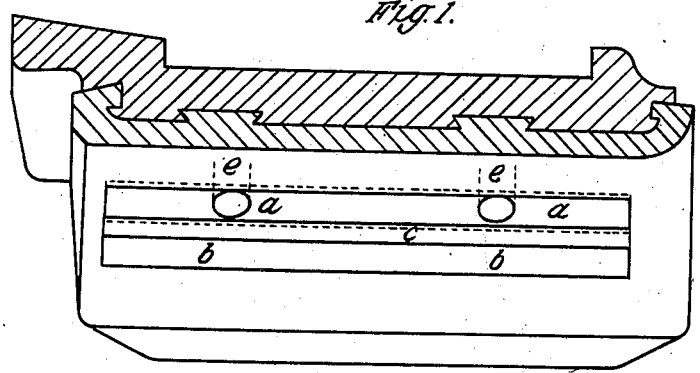

Jan. 13, 1931.    W. PEYINGHAUS    1,789,255
MEANS FOR LUBRICATING AXLE BEARINGS OR JOURNALS
Filed Sept. 24, 1929

Inventor
Walter Peyinghaus
By Cushman, Bryant & Darby
Attys

Patented Jan. 13, 1931

1,789,255

UNITED STATES PATENT OFFICE

WALTER PEYINGHAUS, OF BEZIRK HAGEN, GERMANY

MEANS FOR LUBRICATING AXLE BEARINGS OR JOURNALS

Application filed September 24, 1929, Serial No. 394,850, and in Germany April 4, 1928.

This invention relates to means for lubricating axle bearings or journals of the type in which there is a varying or tapering clearance between the brass and the axle journal.

In my previous application for British Patent No. 14,699 of 1929 the oiling of the axle journal is effected first through the medium of transverse bores which are formed in the brass and from which the oil is permitted to drop onto the journal so as to be carried by the latter to the bearing or contacting surfaces. The oil carried away by the journal is, on reaching the apex of the bearing, spread or flattened out in the tapering gap between the journal and the brass and any oil, which is not utilized for the formation of an oil film between the bearing or contacting surfaces, flows back in a wide band along the inner surface of the brass in order again to drip onto the axle journal from the upper edge of a longitudinal groove formed in the inner surface of the brass.

This indirect method of causing drops of oil to fall onto the axle journal is applicable only in instances where there is a wide or substantial clearance between the journal and the brass. In instances where the clearance is small the oiling is more or less confined to the places, or to those strips of the journal which are opposite, where the transverse bores are situated, the remaining width of the bearing being unaffected as no flowing back of the oil along the inner surface of the brass and no second dripping, can take place.

The object of the present invention is to provide for a more uniform lubricating or oiling especially where the clearance between the brass and the journal is small.

According to the invention the inner surface of the brass or bearing is formed with two longitudinal grooves arranged one above the other the upper one of which is fed from the transverse bores and has a pocket-shaped cross section to allow oil to accumulate therein and to be distributed over the width of the brass. In cases where the clearance between the brass and the journal is small the oil drops passing over the edge of the pocket-shaped groove will be stripped off and carried away by the journal directly and at once, while in cases where the clearance is large they will on the contrary flow first over that part of the inner surface of the brass which is between the two grooves and thence to the upper dripping edge of the second groove and will drop therefrom uniformly on the journal throughout the whole of its width.

In order that the said invention may be clearly understood and readily carried into effect the same will now be described more fully with reference to the accompanying drawings, in which:—

Figure 2:
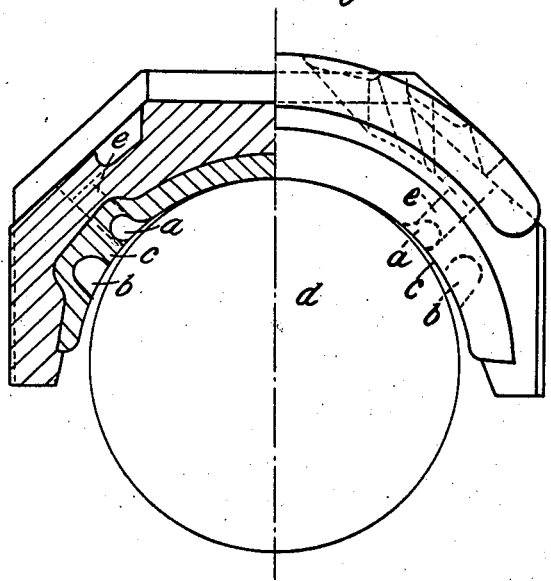

Figure 1 is a longitudinal section through a bearing or brass embodying the invention, and Figure 2 is an end view partly in elevation and partly in section of the brass shown in Figure 1.

$a$ and $b$ are the two lubricating grooves which are cut in the white metal face of the bearing brass resting on the axle journal $d$. These grooves are parallel to each other and arranged one above the other. The upper groove $a$ is pocket-shaped in cross-section, and under this groove and separated from it by a bridge $c$ is the second longitudinal groove $b$ which, unlike the other, is formed so that its upper edge presents an acute angle to the inner face of the brass. $e$ are the transverse bores by which the oil is led to the groove $a$.

In operation, the wetting of the journal $d$ with oil is effected by the oil which is first supplied to the groove $a$ through the transverse bores $e$. This oil accumulates in the pocket-shaped groove and passes in the form of large drops over the bottom edge of the groove so that the journal is supplied throughout the whole of its length with oil for stripping off and carrying away. In cases where there is a narrow journal clearance the oil will be directly carried away by the journal, while in cases where there is a wide journal clearance the greater part of the oil will flow down over the bridge $c$ and into the second groove $b$ and will be caused by the upper edge of this groove to form drops for dripping onto the surface of the journal $b$. Thus a flowing down of the excess oil along the inner surface of the brass and into the oil bath situated below is prevented.

The grooves $a$ and $b$ may be arranged at any desired distance from each other and at any desired point along the circumference of the brass according to the journal clearance available, so long as the upper edge of the groove $b$ is disposed in such a position that the oil dripping therefrom will fall on to the axle journal. That is the bridge $c$ forms in effect a ledge from which oil will drip onto the journal.

What I claim and desire to secure by Letters Patent of the United States is:—

1. Means for lubricating axle journals comprising a bearing brass surmounting the journal so that a tapering clearance is formed therebetween, said brass having at each side therefor two adjacent parallel longitudinal grooves the upper one of which has a pocket-shaped cross-section to allow oil to accumulate therein and the lower one of which is formed with an oil-dripping edge at its upper part which causes oil escaping over the bottom edge of the upper groove and not carried away by the axle journal to drop therefrom onto the whole length of the axle journal.

2. Means for lubricating axle journals comprising a bearing brass surmounting the journal so that a tapering clearance is formed therebetween, said brass having at each side thereof two adjacent parallel longitudinal grooves the upper one of which has a pocket-shaped cross-section to allow oil to accumulate therein and the lower one of which is formed with an oil-dripping edge at its upper part which causes oil escaping over the bottom edge of the upper groove and not carried away by the axle journal to drip therefrom on to the whole length of the axle journal, and oil passages in the brass whereby lubricating oil can pass from the upper side of the brass to the upper groove.

3. Means for lubricating axle journals comprising a bearing brass surmounting the journal so that a tapering clearance is formed therebetween, said brass having at each side thereof a longitudinal pocket-shaped groove in which oil can accumulate, and having below each said pocket and above the lower edge of the brass an oil dripping ledge extending parallel with and adjacent to each groove so that oil escaping over the bottom edge of the groove and not carried away by the axle journal drips from said ledge to the journal.

WALTER PEYINGHAUS.